(12) United States Patent
Akkary et al.

(10) Patent No.: US 8,627,030 B2
(45) Date of Patent: Jan. 7, 2014

(54) LATE LOCK ACQUIRE MECHANISM FOR HARDWARE LOCK ELISION (HLE)

(75) Inventors: Haitham Akkary, Portland, OR (US); Ravi Rajwar, Portland, OR (US); Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1356 days.

(21) Appl. No.: 11/936,249

(22) Filed: Nov. 7, 2007

(65) Prior Publication Data

US 2009/0119459 A1 May 7, 2009

(51) Int. Cl.
*G06F 13/00* (2006.01)
*G06F 13/28* (2006.01)

(52) U.S. Cl.
USPC ............... 711/163; 711/130; 711/E12.091

(58) Field of Classification Search
USPC ................. 711/150, 130; 712/E9.05
See application file for complete search history.

(56) References Cited

U.S. PATENT DOCUMENTS

| 4,763,249 | A  | * | 8/1988 | Bomba et al. | 713/600 |
| 6,560,776 | B1 | * | 5/2003 | Breggin et al. | 717/176 |
| 2003/0079094 | A1 | * | 4/2003 | Rajwar et al. | 711/150 |
| 2004/0215933 | A1 | * | 10/2004 | Nguyen et al. | 712/200 |
| 2008/0115042 | A1 | * | 5/2008 | Akkary et al. | 714/806 |

OTHER PUBLICATIONS

Office Action Received for Chinese Patent Application No. 200810190835.2 mailed on Aug. 22, 2011, 19 Pages of Office Action including 3 pages of English translation.

* cited by examiner

*Primary Examiner* — Reginald Bragdon
*Assistant Examiner* — Eric S Cardwell
(74) *Attorney, Agent, or Firm* — Blakely, Sokoloff, Taylor & Zafman LLP

(57) ABSTRACT

A method and apparatus for a late lock acquire mechanism is herein described. In response to detecting a late-lock acquire event, such as expiration of a timer, a full cachet set, and an irrevocable event, a late-lock acquire may be initiated. Consecutive critical sections are stalled until a late-lock acquire is completed utilizing fields of access buffer entries associated with consecutive critical section operations.

24 Claims, 5 Drawing Sheets

LATE LOCK ACQUIRE MECHANISM FOR HARDWARE LOCK ELISION (HLE)

FIELD

This invention relates to the field of processor execution and, in particular, to acquiring locks for execution of sections of code.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be executed. However, the increase in the number of software threads that may be executed simultaneously has created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hashtable.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. However, some applications may not take advantage of transactional memory programming, as a result, a hardware data synchronization technique, which is often referred to Hardware Lock Elision (HLE), is utilized to elide locks to obtain synchronization benefits similar to transactional memory.

As a result, HLE is able to detect and predict critical sections of code. However, during execution of a critical section for transactional memory or through HLE, when HLE prediction is incorrect, tentative access tracking overflows memory, or an irrevocable event is encountered, often, the critical section is aborted and restarted. Yet, aborting a critical section potentially wastes the execution cycles for the operation performed before the abort.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for Hardware Lock Elision (HLE), specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of critical sections in software, demarcation of critical sections, specific multi-core and multi-threaded processor architectures, interrupt generation/handling, cache organizations, and specific operational details of microprocessors, have not been described in detail in order to avoid unnecessarily obscuring the present invention.

The method and apparatus described herein are for a late-lock acquire scheme during execution of critical sections. Specifically, the late-lock acquire scheme is primarily discussed in reference to multi-core processor computer systems. However, the methods and apparatus for a late-lock acquire scheme are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that execute critical sections. Furthermore, the late-lock acquire scheme is primarily also discussed in reference to execution of critical sections during Hardware Lock Elision (HLE). Yet, a late-lock acquire may be utilized during any critical section execution scheme, such as during transactional execution.

Figure 1:
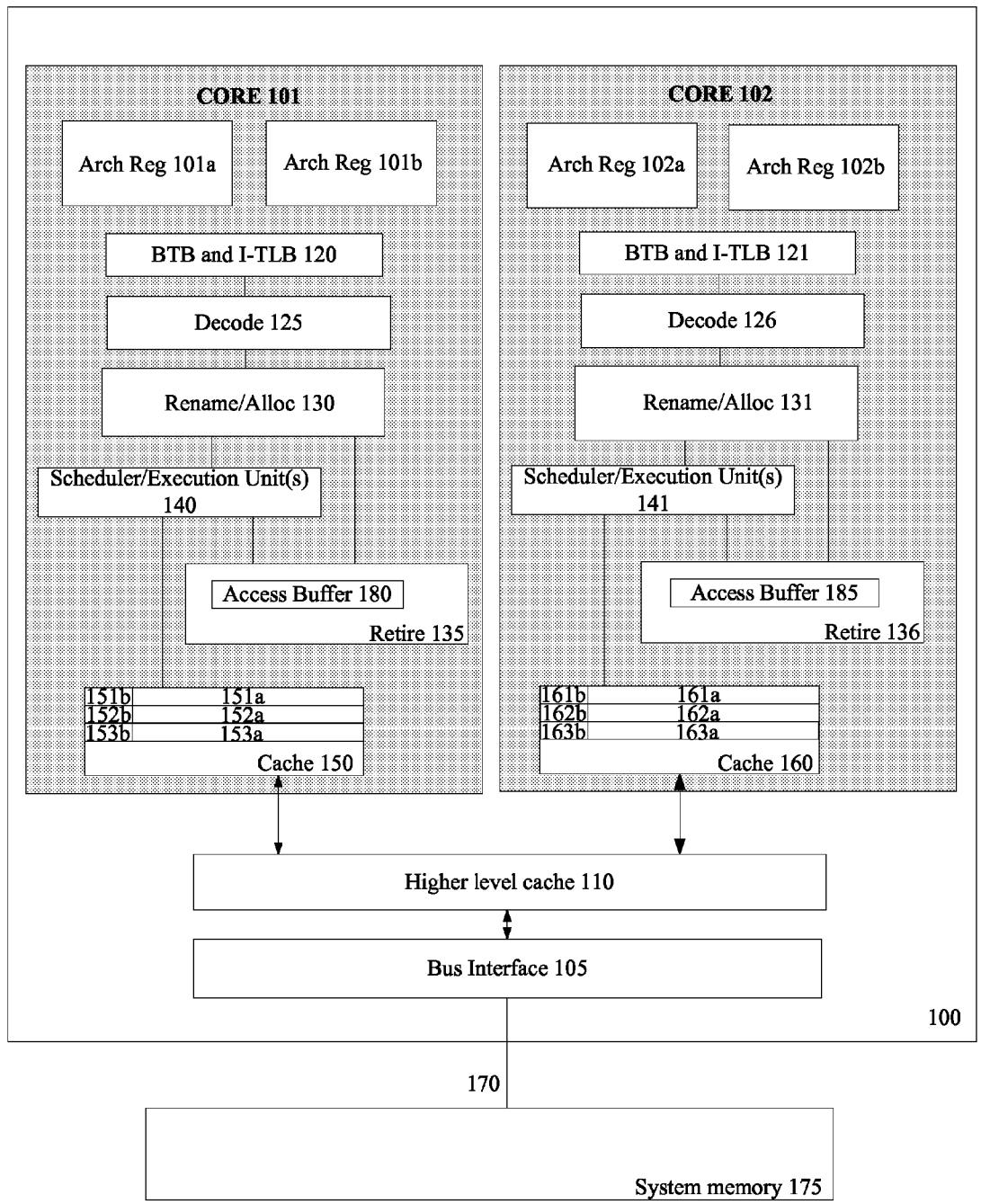
FIG. 1 illustrates an embodiment of a multi-processing element processor including a late-lock acquire mechanism.

Referring to FIG. 1, an embodiment of multi-core processor 100, which is capable of performing late-lock acquire for a critical section is illustrated. As shown, physical processor 100 includes any number of processing elements. A processing element refers to a thread, a process, a context, a logical processor, a hardware thread, a core, and/or any processing element, which potentially shares access to resources of the processor, such as reservation units, execution units, pipelines, and higher level caches/memory. A physical processor typically refers to an integrated circuit, which may include any number of processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. Physical processor 100, as illustrated in FIG. 1, includes two cores, core 101 and 102, which share access to higher level cache 110. In addition, core 101 includes two hardware threads 110a and 110b, while core 102 includes two hardware threads 102a and 102b. Therefore, software entities, such as an operating system or application, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. Therefore, a processing element includes any of the aforementioned entities capable of maintaining a context, such as cores, threads, hardware threads, logical processors, virtual machines, or other processing resources.

In one embodiment, processor 100 is a multi-core processor capable of executing multiple threads in parallel. Here, a first thread is associated with architecture state registers 101a, a second thread is associated with architecture state registers 111b, a third thread is associated with architecture state registers 102a, and a fourth thread is associated with architecture state registers 102b. Reference to processing elements in processor 100, in one embodiment, includes reference to cores 101 and 102, as well as threads 101a, 101b, 102a, and 102b. In another embodiment, a processing element refers to elements at the same level in a hierarchy of processing domain. For example, core 101 and 102 are in the same domain level, threads 101a and 101b are on the same domain level within core 101, and threads 101a, 101b, 102a, and 102b are in the same domain level within cores 101 and 102.

Although processor 100 may include asymmetric cores, i.e. cores with different configurations, functional units, and/ or logic, symmetric cores are illustrated in FIG. 1. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for processing element 101a and processing element 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers 180, and queues may be shared through partitioning. Other resources, such as general purpose internal registers, page-table base register, low-level data-cache and data-TLB 110, execution unit(s) 140, and out-of-order unit 135 are potentially fully shared. Note that a thread may be implemented in any manner of sharing resources of core 101.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 170. Examples of interconnect 170 include a Gunning Transceiver Logic (GTL) bus, a GTL+bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decoded traces. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100.

Reorder/retirement unit 135 includes components, such as the reorder buffers mentioned above and load/store buffers 180 to support out-of-order execution and later retirement of instructions executed out-of-order. Buffers 180, in one embodiment, are capable of holding fields/values to indicate associated memory accesses are to be blocked/stalled until a late-lock acquire in progress for a critical section is completed. Although buffers 180 are shown located in one area, buffers 180 and late-lock acquire logic are not so limited. In fact, tracking logic 180 may be distributed through processor 100, as well as associated with any portion of the front or back end of a processor pipeline.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Note from above, that as illustrated, processor 100 is capable of executing at least four software threads. In addition, in one embodiment, processor 100 is capable of transactional execution. Transactional execution usually includes grouping a plurality of instructions or operations into a transaction, atomic section of code, or a critical section of code. In some cases, use of the word instruction refers to a macro-instruction which is made up of a plurality of operations. In a processor, a transaction is typically executed speculatively and committed upon the end of the transaction. A pendency of a transaction, as used herein, refers to a transaction that has begun execution and has not been committed or aborted, i.e. pending. Usually, while a transaction is still pending, locations loaded from and written to within a memory are tracked.

Upon successful validation of those memory locations, the transaction is committed and updates made during the transaction are made globally visible. However, if the transaction is invalidated during its pendency, the transaction is restarted without making the updates globally visible. Often, software demarcation is included in code to identify a transaction. For example, transactions may be grouped by instructions indicating a beginning of a transaction and an end of a transaction. However, transactional execution often utilizes programmers or compilers to insert the beginning and ending instructions for a transaction.

Therefore, in one embodiment, processor 100 is capable of hardware lock elision (HLE), where hardware is able to elide locks for critical sections and execute them simultaneously. Here, pre-compiled binaries without transactional support or newly compiled binaries utilizing lock programming are capable of benefiting from simultaneous execution through support of HLE. As a result of providing transparent compatibility, HLE often includes hardware to detect critical sections and to track memory accesses. In fact, since locks ensuring exclusion to data are elided, memory accesses may be tracked in a similar manner as during execution of transactions. Consequently, the late-lock acquire scheme discussed herein may be utilized during transactional execution, HLE, another memory access tracking scheme, or a combination thereof. Therefore, discussion of execution of critical sections below potentially includes reference to a critical section of a transaction or a critical section detected by HLE.

In one embodiment, a memory device being accessed is utilized to track accesses from a critical section. For example, lower level data cache 150 is utilized to track accesses from critical sections; either associated with transactional execution or HLE. Cache 150 is to store recently accessed elements, such as data operands, which are potentially held in memory coherency states, such as modified, exclusive, shared, and invalid (MESI) states. Cache 150 may be organized as a fully associative, a set associative, a direct mapped, or other known cache organization. Although not illustrated, a D-TLB may be associated with cache 150 to store recent virtual/linear to physical address translations.

As illustrated, lines 151, 152, and 153 include portions and fields, such as portion 151*a* and field 151*b*. In one embodiment fields 151*b*, 152*b*, and 153*b* and portions 151*a*, 152*a*, and 153*a* are part of a same memory array making up lines 151, 152, and 153. In another embodiment, fields 151*b*, 152*b*, and 153*b* are part of a separate array to be accessed through separate dedicated ports from lines 151*a*, 152*a*, and 153*a*. However, even when fields 151*b*, 152*b*, and 153*b* are part of a separate array, fields 151*b*, 152*b*, and 153*b* are associated with portions 151*a*, 152*a*, and 153*a*, respectively. As a result, when referring to line 151 of cache 150, line 151 potentially includes portion 151*a*, 152*b*, or a combination thereof. For example, when loading from line 151, portion 151*a* may be loaded from. Additionally, when setting a tracking field to track a load from line 151, field 151*b* is accessed.

In one embodiment, lines, locations, blocks or words, such as lines 151*a*, 152*a*, and 153*a* are capable of storing multiple elements. An element refers to any instruction, operand, data operand, variable, or other grouping of logical values that is commonly stored in memory. As an example, cache line 151 stores four elements in portion 151*a*, such as four operands.

The elements stored in cache line 151*a* may be in a packed or compressed state, as well as an uncompressed state. Moreover, elements may be stored in cache 150 aligned or unaligned with boundaries of lines, sets, or ways of cache 150. Memory 150 will be discussed in more detail in reference to the exemplary embodiments below.

Cache 150, as well as other features and devices in processor 100, store and/or operate on logic values. Often, the use of logic levels, logic values, or logical values is also referred to as 1's and 0's, which simply represents binary logic states. For example, a 1 refers to a high logic level and 0 refers to a low logic level. Other representations of values in computer systems have been used, such as decimal and hexadecimal representation of logical values or binary values. For example, take the decimal number 10, which is represented in binary values as 1010 and in hexadecimal as the letter A.

In the embodiment illustrated in FIG. 1, accesses to lines 151, 152, and 153 are tracked to support execution of critical sections. Accesses include operations, such as reads, writes, stores, loads, evictions, snoops, or other known accesses to memory locations. Access tracking fields, such as fields 151*b*, 152*b*, and 153*b* are utilized to track accesses to their corresponding memory lines. For example, memory line/portion 151*a* is associated with corresponding tracking field 151*b*. Here, access tracking field 151*b* is associated with and corresponds to cache line 151*a*, as tracking field 151*b* includes bits that are part of cache line 151. Association may be through physical placement, as illustrated, or other association, such as relating or mapping access tracking field 151*b* to memory line 151*a* or 151*b* in a hardware or software lookup table.

As a simplified illustrative example, assume access tracking fields 151*b*, 152*b*, and 153*b* include two transaction bits: a first read tracking bit and a second write tracking bit. In a default state, i.e. a first logical value, the first and second bits in access tracking fields 151*b*, 152*b*, and 153*b* represent that cache lines 151, 152, and 153, respectively, have not been accessed during execution of a critical section.

Assume a load operation to load from line 151*a* is encountered in a critical section. The first read tracking bit is updated from the default state to a second accessed state, such as a second logical value. Here, the first read tracking bit holding the second logical value represents that a read/load from cache line 151 occurred during execution of the critical section. A store operation may be handled in a similar manner to update the first write tracking bit to indicate a store to a memory location occurred during execution of the critical section Consequently, if the tracking bits in field 151*b* associated with line 151 are checked, and the transaction bits represent the default state, then cache line 151 has not been accessed during a pendency of a critical section. Inversely, if the first read tracking bit represents the second value, then cache line 151 has been previously read during execution of a critical section. Furthermore, if the first write tracking bit represents the second value, then a write to line 151 occurred during a pendency of the critical section.

Access fields 151*b*, 152*b*, and 153*b* are potentially used to support any type of transactional execution or HLE. In one embodiment, where processor 100 is capable of hardware transactional execution, access fields 151*b*, 152*b*, and 153*b* are to detect conflicts and perform validation. In another embodiment, where hardware transactional memory (HTM), software transactional memory (STM), or a hybrid thereof is utilized for transactional execution, access tracking fields 151*b*, 152*b*, and 153*b* provide similar tracking and validation functions.

As a first example of how access fields, and specifically tracking bits, are potentially used to aid transactional execution, a co-pending application entitled, "Hardware Acceleration for A Software Transactional Memory System," with Ser. No 11/349,787 discloses use of access fields/transaction bits to accelerate a STM. As another example, extending/virtualizing transactional memory including storing states of access fields/transaction tracking bits into a second memory are discussed in co-pending application entitled, "Global Overflow Method for Virtualized Transactional Memory," with Ser. No. 11/479,902.

Figure 2:
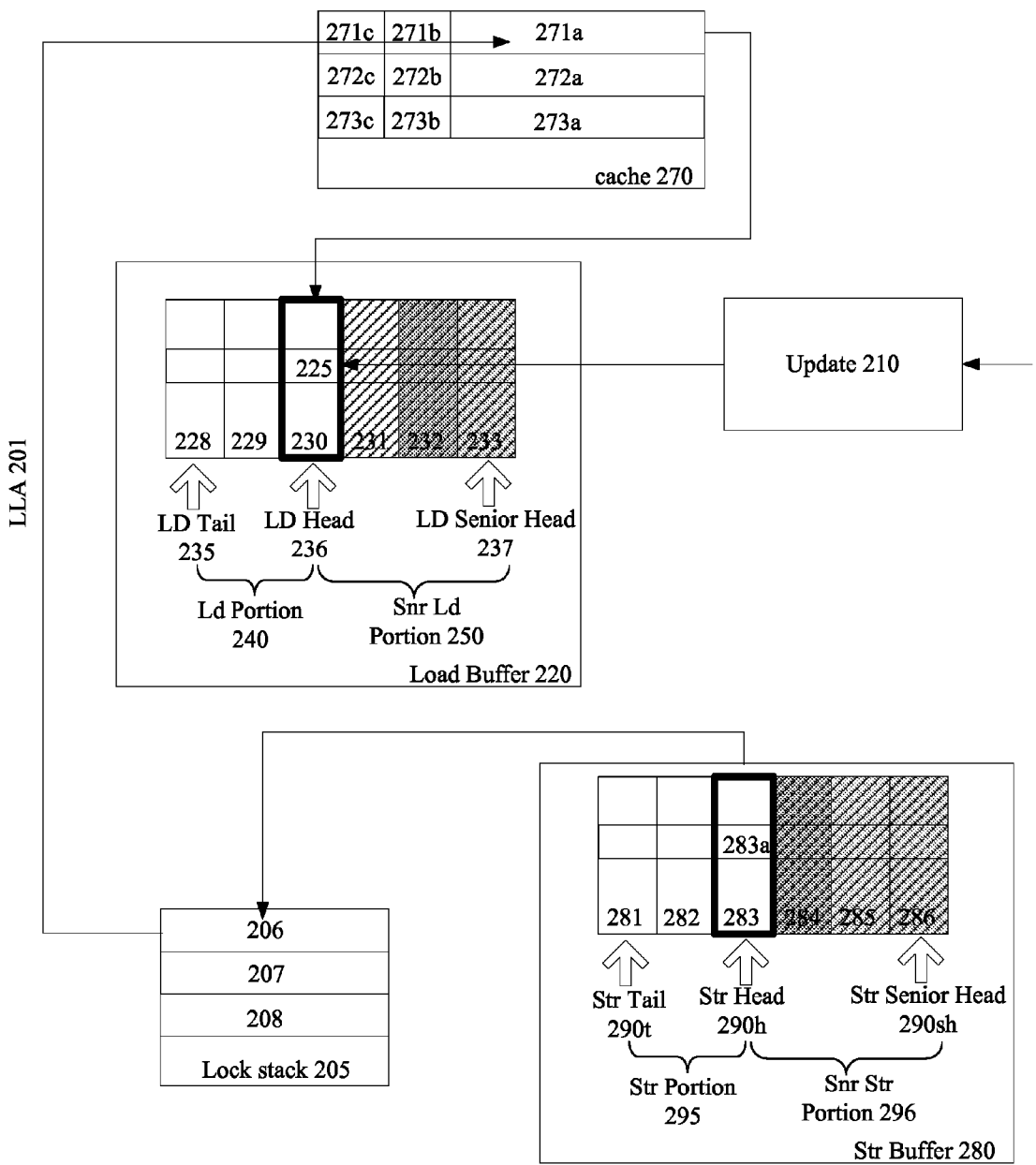
FIG. 2 illustrates an embodiment of logic to perform late-lock acquire for a critical section.

Turning to FIG. 2, an embodiment of logic to initiate a late lock acquire for a critical section is illustrated. As stated above, a transaction is often demarcated by start transaction and end transaction instructions, which allows for easy identification of critical sections. However, HLE includes detecting/identifying and potentially predicting critical sections, eliding locks demarcating the critical sections, check pointing register states for roll-back upon critical section abort, tracking tentative memory updates, and detecting potential data conflicts. One difficulty in detecting/identifying critical sections is delineating between regular lock instructions, which do not define a critical section, and lock/lock release instructions that demarcate a critical section.

In one embodiment, for HLE a critical section is defined by a lock instruction, i.e. a start critical section instruction, and a matching lock release instruction, i.e. and end critical section instruction. A lock instruction may include a load from an address location, i.e. checking if the lock is available, and a modify/write to the address location, i.e. an update to the address location to acquire the lock. A few examples of instructions that may be used as lock instructions include, a compare and exchange instruction, a bit test and set instruction, and an exchange and add instruction. In Intel's IA-32 and IA-64 instruction set, the aforementioned instructions include CMPXCHG, BTS, and XADD, as described in Intel® 64 and IA-32 instruction set documents discussed above.

As an example, where predetermined instructions, such as CMPXCHG, BTS, and XADD are detected/recognized, detection logic and/or decode logic detects the instructions utilizing an opcode field or other field of the instruction. As an example, CMPXCHG is associated with the following opcodes: 0F B0/r, REX+0F B0/r, and REX.W+0F B1/r. In another embodiment, operations associated with an instruction are utilized to detect a lock instruction. For example, in x86 the following three memory micro-operations are often used to perform an atomic memory update indicating a potential lock instruction: (1) Load_Store_Intent (L_S_I) with opcode 0x63; (2) STA with opcode 0x76; and (3) STD with opcode 0x7F. Here, L_S_I obtains the memory location in exclusive ownership state and does a read of the memory location, while the STA and STD operations modify and write to the memory location. In other words, detection logic is searching for a load with store intent (L_S_I) to define the beginning of a critical section. Note that lock instructions may have any number of other non-memory, as well as other memory, operations associated with the read, write, modify memory operations.

Often a stack, such as lock stack 205, is utilized to hold an entry, such as entry 206, which is associated with a lock instruction. Lock instruction entry (LIE) 206 may include any number of fields to store critical section related information, such as a lock instruction store physical address (LI Str PA), a lock instruction load value and load size, an unlocked value, a lock instruction store value and size, a locked value, a micro-operation count, a release flag, a late lock acquire flag, and a last instruction pointer field.

Here, a lock release instruction corresponding to the lock instruction demarcates the end of a critical section. Detection logic searches for a lock release instruction that corresponds to the address modified by the lock instruction. Note that the address modified by the lock instruction may be held in LIE 206 on lock stack 205. As a result, in one embodiment, a lock release instruction includes any store operation that sets the address modified by the corresponding lock instruction back to an unlocked value. An address referenced by an L_S_I instruction that is stored in lock stack 206 is compared against subsequent store instructions to detect a corresponding lock release instruction. More information on detecting and predicting critical sections may be found in a co-pending application entitled, "A CRITICAL SECTION DETECTION AND PREDICTION MECHANISM FOR HARDWARE LOCK ELISION," with application Ser. No. 11/599,009.

In other words, with HLE, in one embodiment, a critical section is demarcated by an L_S_I instruction and a corresponding lock release store instruction. Similarly, a critical section of a transaction is defined by a start transaction instruction and an end transaction instruction. Therefore, reference to a start critical section operation/instruction includes any instruction starting an HLE, transactional memory, or other critical section, while reference to an end critical section operation/instruction includes starting an HLE, transactional memory, or other critical section ending instructions.

In one embodiment, an access buffer, such as a load buffer 220 and/or store buffer 280, is to hold access entries associated with memory access operations. Each access buffer entry includes a block code field/portion. By default the block code field is to hold a first value, such as an unblocked value, to indicate a corresponding memory access operation is free to be dispatched. However, when a late-lock acquire is initiated for a current critical section, block code fields for buffer entries associated with a subsequent critical section are updated to a second value or blocked value to indicate the associated memory access operations are to be blocked/stalled.

As illustrated, load buffer 220 includes a plurality of load buffer entries, such as entries 228-233. When a load operation is encountered, a load buffer entry is created/stored in load buffer 220. In one embodiment, load buffer 220 stores load buffer entries in program order, i.e. an order the instructions or operations are ordered in the program code. Here, youngest load buffer entry 228, i.e. the most recently stored load buffer entry, is referenced by load tail pointer 235. In contrast, oldest load buffer entry 230, which is not a senior load, is referenced by load head pointer 236.

In an in-order execution processing element, load operations are executed in the program order stored in the load buffer. As a result, the oldest buffer entries are executed first, and load head pointer 236 is re-directed to the next oldest entry, such as entry 229. In contrast, in an out-of-order machine, operations are executed in any order. However, entries are typically removed, i.e. de-allocated from the load buffer, in program order. As a result, load head pointer 236 and load tail pointer 235 operate in similar manner between the two types of execution.

Load buffer entry 230 may include any type of information, such as a memory update value, a pointer value, a reference to an associated load operation, a reference to an address associated with the load operation, a value loaded from an address, and other associated load buffer values, flags, or references. Note that store buffer 280 may operate in a similar manner to load buffer 220, as store buffer 280 is depicted as including entries 281-286 and block code field 283*a* for entry 283. In addition, both load buffer 220 and store buffer 280 include senior load portions 250 and 280, respectively. As a result, during transactional execution or HLE, pre-retire accesses, post-retire access, or a hybrid thereof may be used to update access tracking bits 271-273*a-b*. A co-pending application entitled, "A POST-RETIRE SCHEME FOR TRACKING TENTATIVE ACCESSES DURING TRANSACTIONAL EXECUTION," with application Ser. No. 11/517,029 discusses in more detail utilization of post-retire access tracking for tentative memory accesses. In addition, a co-pending application entitled, "A PRE-POST RETIRE HYBRID HARDWARE LOCK ELISION (HLE) SCHEME," with application Ser. No. 11/936,243 discusses a hybrid scheme for tentative access tracking.

In one embodiment, each load buffer entry, such as entry 230, includes a block code field, such as block code field 225. As an example, assume a Load with Store Intention (LSI) operation associated with load entry 230 references a system memory address. Whether originally owned and located in cache line 271*a* or fetched in response to a miss to cache 270, assume the element referenced by the system memory address currently resides in cache line 271*a*. In this example, cache line 271*a* holds a lock value for an address or range of addresses to be accessed during execution of a critical section. Therefore, in loading line 271*a* the lock value is read. Here, it is determined if the lock 271*a* holds a locked value or an unlocked value.

When the load operation is allocated, memory update field 225 is, by default, updated to an unblocked value to indicate the load operation is able to be dispatched. Note that updating a bit, a value, or a field does not necessarily indicate a change to the bit, value or the field. For example, if field 225 is already set to a logical zero, then updating to a logical zero potentially includes re-writing a logical zero to field 225, as well as no action to leave field 225 holding a logical zero.

In contrast to the scenario discussed above, assume load entry 230 is associated with a subsequent critical section, such as a subsequent start critical section operation. In addition, a current critical section encounters a late-lock acquire event. Examples of a late-lock acquire event includes expiration of a timer, a cache set being full, and detecting an irrevocable event. More detail about late-lock acquire events is discussed below. In response to detecting a late-lock acquire event, field 225 is updated to a blocked value to block/stall the subsequent start critical section operation. Blocking and stalling of a subsequent start critical section operation, as well as blocking creation of a checkpoint for the subsequent critical section, is also discussed in more detail below.

In one embodiment, the current critical section determines if a pre-condition is satisfied before initiating a late-lock acquire. A first example of a pre-condition includes waiting for pending fill buffer entries to be globally ordered. Here, when an access to cache 270 misses, i.e. the line is not present in a modified or exclusive state, then a fill buffer entry is allocated to receive the requested element upon retrieval. In one embodiment, global ordering includes any ordering of at least stores prior to a late-lock acquire store to ensure memory consistency, i.e. no memory ordering violations.

Another example of a potential pre-condition for late-lock acquire includes determining a start critical section operation for the current critical section has updated a lock stack with a lock value. As discussed above, a start critical section operation may include a load/read to determine if the lock holds a locked or unlocked value and a store operation to perform a store of a lock value to the lock location. However, in HLE locks are elided and critical sections are tentatively executed. Therefore, the store, which may be associated with store entry 283 in store buffer 280, is not performed to update line 271*a*, but rather is to update lock stack 205. In fact, when a late-lock acquire is to be attempted, the lock value from lock stack entry 206 is used to update cache line 271*a* to the locked value. In other words, for HLE, the lock in cache line 271*a* is not acquired, until a late lock is performed by updating cache line 271*a* with a locked value from entry 206.

However, in one embodiment, stores, such as senior stores, are blocked/stalled in response to a late-lock acquire being initiated. Consequently, if the store to update lock stack entry 206 with the lock value has not been performed and a late-lock acquire is initiated, a dead-lock situation potentially occurs. Here, the store of the lock value to be used for the late-lock acquire has not been performed to lock stack 205 and that store is now stalled during late-lock acquire. In other words, the late lock acquire is waiting for the store to lock stack 205, and the store is waiting on the late-lock acquire to complete before it updates lock stack 205. Therefore, in one embodiment, a pre-condition includes determining the store to lock stack 205 with the lock value for the current critical section has been performed before initiating a late-lock acquire for the current critical section.

As stated above, in one embodiment, during a late lock acquire for a current critical section, when a subsequent critical section is encountered, the subsequent critical section is stalled. In one embodiment, stalling a critical section includes blocking a start critical section operation, such as an LSI associated with load entry 230, from creating a checkpoint. Often, a checkpoint is created when the LSI is retired. Therefore, during a late-lock acquire for a current critical section, a start subsequent critical section operation, such as the LSI associated with entry 230, is to be blocked. Here, update logic 210 updates field 225 to a blocked value. In response to field 225 holding a blocked value, the LSI associated with entry 230 is not dispatched. As an example, a scheduler does not schedule the subsequent critical section LSI based on field 225 holding the blocked value. Note that update logic may set any number of fields similar to field 225 to a blocked value to block/stall any other operations.

In one embodiment, a blocked value includes an identifier (ID). As a result, when a condition is satisfied to unblock an access operation, such as a load associated with entry 230, the ID is broadcast by update logic 210. All of the fields including the ID are release, i.e. unblocked. For example, when field 225 includes a blocked value, such as a MOB_BLOCK_CODE value, then in response to a store buffer draining, an ID is broadcast by update logic 210. All load entries matching the ID are released, i.e. unblocked. As another example, field 225 may be an HLE_BLOCK_CODE field. Here, in response to a late-lock acquire completing, an ID is broadcast to entries in load buffer 220, which releases/unblocks load entries matching the ID.

As stated above, in one embodiment, during late-lock acquire senior stores are stalled. Here, logic, such as logic 225, updates fields, such as field 283*a*, to a blocked value to stall senior stores. Here, race conditions between an end critical section operation, such as a lock release operation, and a late lock acquire operation are avoided. As an example, assume a lock is to be held in cache line 271*a*. A start critical section operation to acquire the lock is elided and the value to obtain the lock is stored in lock stack entry 206. Next, a late-lock acquire event is detected. Here, a lock release store referencing an unlocked value would potentially contend with a late-lock acquire store to obtain the lock. As a result, senior store dispatches are stalled to avoid this potential contention.

Note, that lock stack 205, as illustrated, includes multiple stack entries. In one embodiment, lock stack 205 is capable of maintaining multiple entries for multiple critical sections, such as nested critical sections. As an example, when a late-lock acquire is to be performed for one critical section nested on stack 205, a late-lock acquire is to be performed for the other critical sections referenced on stack 205. To illustrate, a critical section referenced by LIE 206 is the innermost critical section nested within a second critical section referenced by LIE 207. Additionally, the second critical section is nested within an outermost critical section associated with entry 208.

Here, when a late-lock acquire is to be performed for the innermost critical section, a late-lock acquire is also to be performed for the second and outermost critical sections. However, in another embodiment, when a lock release has been observed for the innermost critical section and a late-lock acquire is to be performed for the second critical section, then a late-lock acquire is to be performed for the outermost critical section and not the innermost critical section. In other words, a late-lock acquire is performed for all critical sections at a higher nested depth than the current late-lock acquire in this embodiment.

Figure 3A:
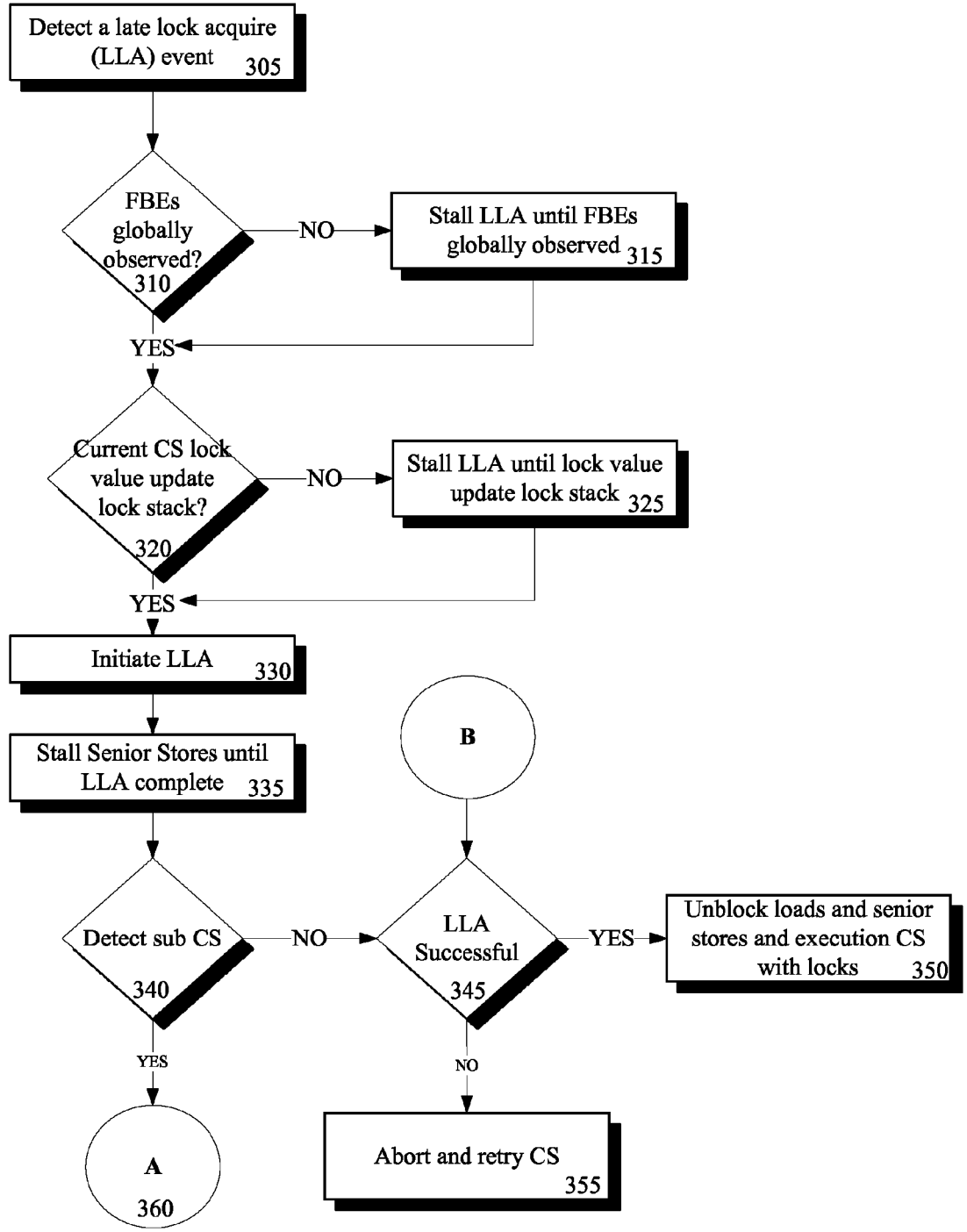
FIG. 3a illustrates an embodiment of a flow diagram for a method of performing a late-lock acquire for a current critical section.
Figure 3B:
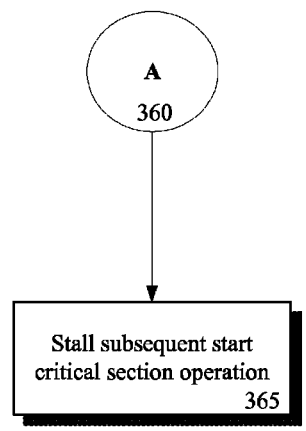
FIG. 3b illustrates an embodiment of a flow diagram for a method of stalling subsequent critical section operations during a late-lock acquire for a current critical section.
Figure 3C:
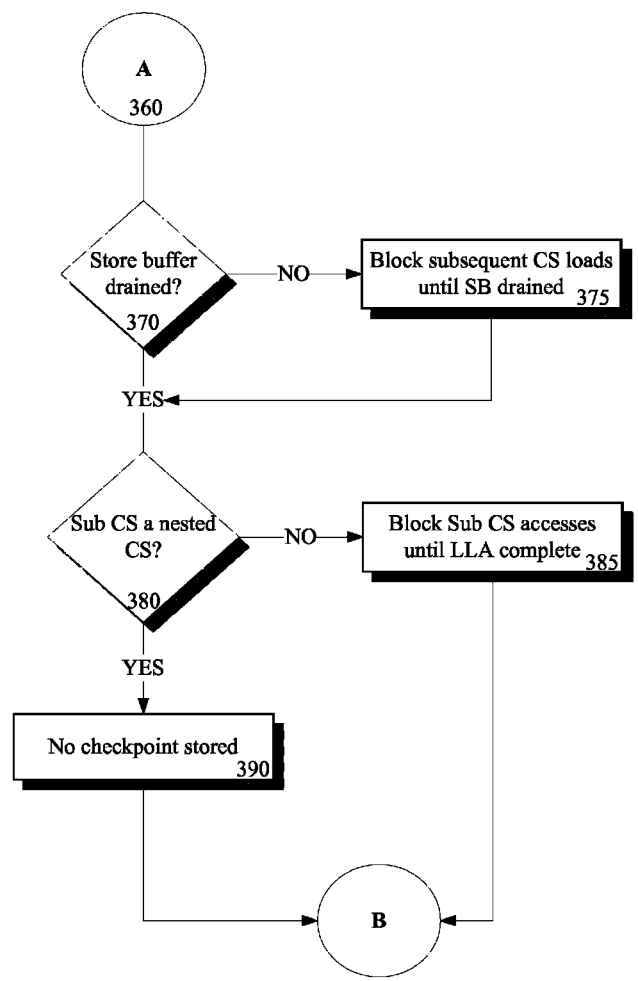
FIG. 3c illustrates another embodiment of a flow diagram for a method of stalling subsequent critical section operations during a late-lock acquire for a current critical section.

Turning to FIGS. 3a-3c an embodiment of a flow diagram for a method of performing a late-lock acquire during hardware lock elision execution of a critical section is illustrated. Although, the flow diagram illustrates a flow in a reasonably linear fashion, flows may take place in any order in different embodiments. For example, determining if filter buffer entries are globally observed may occur after determining if a current critical section lock value has updated a lock stack.

In flow 305, a late-lock acquire event is detected. Here, a start critical section operation has already been detected and elided. For example, a lock value, which is to acquire a lock for the critical section, is stored in a lock instruction entry (LIE) on a lock stack. Examples of late-lock acquire events include expiration of a timer, a full cache set, and an irrevocable event.

In one embodiment, expiration of a timer includes expiration of a watchdog timer. Here, a watchdog timer is initiated in response to detecting a load with store intention (LSI) operation and/or allocating an associated LIE. If a corresponding lock release instruction is not detected before the watchdog timer expires then a late-lock acquire is to be performed. In other words, upon predicting a critical section start and not discovering a corresponding end to the critical section in an amount of time, a lock is to be acquired.

In another embodiment, a late-lock acquire includes a full cache set. For example, during execution of a critical section, accesses are tracked to detect data conflicts. However, a cache set may fill up with tentative accesses tracked during execution of a critical section. Therefore, a subsequent access may result in selection of a line of cache for eviction, where that line includes tracking information for a previous tentative access. As a result, a late-lock acquire may be initiated in response to the eviction indicating a full cache set.

As yet another example, a late-lock acquire event may include detection of an irrevocable event, i.e. an event, process, or access that may not be easily undone. As a specific example, an I/O access often is irrevocable, as an access to an I/O device is difficult to undue. Therefore, in response to detecting an I/O access, a late-lock acquire is to be initiated.

Next, in flow 310, after detecting a late lock acquire, it is determined if previous fill buffer entries (FBEs) have been globally observed. If previous entries are not globally observed, then the late-lock acquire is stalled, i.e. not initiated, until previous FBEs are globally observed/ordered in flow 315. In one embodiment, globally observed includes ordered in any manner, such as for dispatch on a bus/interconnect to be fulfilled. Also, as an example, stalling of a late-lock acquire includes updating a store buffer entry associated with a late-lock acquire store with a blocked value.

As another potential pre-condition to late-lock acquire, it is determined in flow 320 if a current critical section lock value has updated the lock stack. As stated above, a start critical section instruction for a critical section often includes a store instruction to acquire a lock by storing a lock value to a lock location. However, during HLE the store is elided to the lock location and the lock value is recorded in a lock stack entry associated with the critical section. In one embodiment, senior stores are stalled, such as in flow 335. However, as the lock value from the lock stack is to be utilized during a late-lock acquire, before senior stalls are stored, a late-lock acquire is stalled until the lock value updates the lock stack in flow 325.

Next, in flow 330 a late lock acquire is initiated. In one embodiment, initiating a late-lock acquire includes initiating a store operation to store the lock value from the lock stack to a lock location to acquire the lock. Note that a late-lock acquire may fail, as in flow 345, and a critical section may be aborted and retried in flow 355. For example, during a late-lock acquire, the lock may already be acquired by another processing element. Here, the late-lock acquire may spin until the lock is released and then acquire the lock when it is released by the other processing element. Alternatively, the late-lock acquire is immediately failed and the critical section is aborted/restarted.

In one embodiment, senior stores are stalled during the late-lock acquire, as illustrated in flow 335. Note that a late-lock acquire may complete successfully in flow 345, without detecting a subsequent critical section; in which case, loads and senior stores are unblocked, while execution of the critical section with locks continues in flow 350. However, if a subsequent critical section in flow 340, then the flow continues through connection flow 360 to FIGS. 3a and 3b.

FIG. 3a illustrates one embodiment of handling a subsequent critical section, such as a consecutive critical section, during a late-lock acquire for a critical section. Here, at flow 365 the subsequent start critical section operation is stalled. For example, a load with store intention operation is blocked in a load buffer until the late lock acquire is completed. FIG. 3b illustrates another embodiment of handling a subsequent critical section during a late-lock acquire for a current critical section.

In flow 370, it is determined if a store buffer is drained. If the store buffer is not drained, then subsequent critical section loads are blocked until the store buffer is drained in flow 375. In one embodiment, load buffer entries include a block_code field. When the block_code field holds a blocked value, the associated load is blocked from dispatch. Here, when the store buffer is drained, a value, such as an ID, is broadcast to the load buffer. Load buffer entries matching the value are unblocked/released for dispatch.

After the store buffer is drained, it is determined if the subsequent critical section is a nested critical section in flow 380. In one embodiment, if a lock release, i.e. a store to release a lock, for the current critical section is not detected when the store buffer is drained, then the subsequent critical section is a nested critical section. Here, no checkpoint is created, as the original checkpoint for the outermost critical section is potentially sufficient. In contrast, subsequent critical section accesses, such as a load with store intention access, is blocked until the late-lock acquire is complete. In one embodiment, stalling an L_S_I includes blocking the L_S_I from creating a checkpoint. Here, a block code field, similar to the block code field above may be utilized to block accesses. To illustrate, the first block code field is a MOB_BLOCK_CODE field and the second block code field is an HLE_BLOCK_CODE field. Similarly, when the late-lock acquire is completed, a value is broadcast to release/unblock the L_S_I.

As illustrated above, critical sections may be executed utilizing transactional memory and/or hardware lock elision (HLE). Instead of aborting a critical section and wasting previous execution cycles by retrying the critical section, a late-lock acquire may be attempted to continue forward with execution of the critical section. However, to prevent deadlocks and invalid data, some conditions may be optionally imposed before initiating the late-lock acquire and during the late-lock acquire. For example, a subsequent consecutive critical section may be stalled until a late-lock acquire is completed for a current critical section to ensure coherence and data validity.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); read-only memory (ROM); magnetic or optical storage medium; and flash memory devices. As another example, a machine-accessible/readable medium includes any mechanism that receives, copies, stores, transmits, or otherwise manipulates electrical, optical, acoustical or other form of propagated signals (e.g., carrier waves, infrared signals, digital signals); etc including the embodiments of methods, software, firmware or code set forth above.

Reference throughout this specification to "one embodiment" or "an embodiment" means that a particular feature, structure, or characteristic described in connection with the embodiment is included in one embodiment of the present invention and is not required to be present in all discussed embodiments. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made without departing from the broader spirit and scope of the invention as set forth in the appended claims. The specification and drawings are, accordingly, to be regarded as an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

What is claimed is:

1. An apparatus comprising:
    decode logic adapted to recognize a lock instruction at a start of a critical section to obtain a lock for the critical section;
    execution logic adapted to elide at least a part of the lock instruction that is to obtain the lock for the critical section, to store an address and a lock value referenced by the lock instruction in a lock entry, and to execute the critical section without the lock for the critical section; and
    late-lock acquire logic coupled to the execution logic, the late-lock acquire logic being adapted to cause the execution logic to attempt to execute the at least the part of the lock instruction to obtain the lock for the critical section after the start of the critical section and without a restart of the critical section in response to encountering a late-lock acquire event during a pendancy of the critical section.

2. The apparatus of claim 1, further comprising a cache memory associated with the execution logic, wherein the lock instruction is to reference the lock value and the address that is to be associated with a line of the cache memory, and wherein the late-lock acquire logic being adapted to cause the execution logic to attempt to execute the lock instruction to obtain the lock for the critical section comprises the late-lock acquire logic being adapted to cause the execution logic to execute a store of the lock value to the line of the cache memory that is associated with the address if the line of the cache memory represents that the lock for the critical section is available.

3. The apparatus of claim 2, further comprising:
    a storage area coupled to the execution logic and the late-lock acquire logic, the storage area being adapted to hold the address associated with lock value in a lock entry in a stack of lock entries; and
    detection logic coupled to the decode logic and the execution logic, the detection logic being adapted to identify the at least the part of the lock instruction is to be elided and the cause the execution logic to elide the at least the part of the lock instruction, wherein the at least the part of the lock instruction comprises a store to the address of the lock value.

4. The apparatus of claim 3, wherein a store buffer associated with the execution logic is adapted to hold a store buffer entry associated with the store to the address of the lock value, the store buffer entry being adapted to hold a block code field, wherein update logic associated with the store buffer is adapted to update the block code field to a block value in response to encountering the late-lock acquire event.

5. The apparatus of claim 4, wherein the update logic is further adapted to update the block code field to an unblocked value in response to the late-lock acquire logic causing the execution logic to successfully complete the attempt to execute the lock instruction to obtain the lock for the critical section.

6. The apparatus of claim 5, wherein the lock instruction includes a read modify write (RMW) instruction with a read operation of the RMW instruction including a Load with Store Intent (LSI) operation, and wherein the late-lock acquire logic causing the execution logic to successfully complete the attempt to execute the lock instruction to obtain the lock for the critical section comprises the late-lock acquire logic causing the execution logic to: execute the LSI operation to load a loaded value from the address; execute a modify operation to modify the loaded value from an available value to the lock value; and write the lock value to the address to obtain the lock.

7. The apparatus of claim 1, wherein the late-lock acquire event is selected from a group consisting of an expiration of a timer indicating no lock release instruction corresponding to the lock instruction has been detected by the decode logic in a predetermined amount of time, a detection of all lines in a cache set having speculative information, and an occurrence of an irrevocable event.

8. An apparatus comprising:
a processing element adapted to execute a current critical section and a subsequent critical section, wherein the processing element is further adapted to elide lock acquisition at the start of the current and subsequent critical sections;
an access buffer associated with the processing element, the access buffer adapted to hold an access entry associated with an access operation from the subsequent critical section, the access buffer entry being adapted to hold a block code field wherein the access operation is to be blocked from being dispatched in response to the access entry holding a block code field including a blocked value; and
update logic coupled to the access buffer, the updated logic being adapted to update the block code field to include the blocked value in response to the processing element attempting a late lock acquire for the current critical section without a restart of the current critical section after the processing element elides lock acquisition for the current critical section.

9. The apparatus of claim 8, wherein the block code field is adapted to hold, by default, an unblocked value, wherein the access operation is free to be dispatched in response to the block code field including the unblocked value.

10. The apparatus of claim 8, wherein attempting the late-lock acquire for the current critical section is in response to detecting a late-lock acquire event during execution of the current critical section after the processing element elides lock acquisition for the current critical section, and wherein the late-lock acquire event is selected from a group consisting of a timer expiration event, a full cache set event, and an irrevocable event.

11. The apparatus of claim 8, wherein the update logic being adapted to update the block code field to include the blocked value in response to the processing element attempting a late lock acquire for the current critical section without a restart of the current critical section after the processing element elides lock acquisition for the current critical section comprises the updated logic being adapted to update the block code field to include the blocked value in response to detecting the late lock acquire event and further in response to fulfilling a late-lock acquire pre-condition.

12. The apparatus of claim 11, wherein the late-lock acquire pre-condition includes allowing a plurality of pending fill buffer entries to be globally observed.

13. The apparatus of claim 11, wherein the access buffer is a load buffer, and wherein the access operation includes a subsequent Load with Store Intention (L_S_I) operation to designate a start of the subsequent critical section.

14. The apparatus of claim 13, further comprising a lock-stack, which includes a lock stack entry associated with a current L_S_I operation to designate a start of the current critical section, wherein the late-lock acquire pre-condition includes waiting for a store operation associated with the current L_S_I for the current critical section to update the lock stack entry.

15. The apparatus of claim 13, wherein the blocked value includes an identifier, and wherein in response to completing the late lock acquire the update logic is further adapted to broadcast the identifier to the load buffer entry to update the block code field to an unblocked value.

16. A method comprising:
eliding a lock acquire operation at a start of a current critical section;
detecting a late-lock acquire event during execution of the current critical section;
initiating a late-lock acquire for the current critical section without restating the current critical section in response to detecting the late-lock acquire event during execution of the critical section;
stalling a subsequent lock acquire operation for a subsequent critical section in response to an access buffer holding a reference to the subsequent lock acquire operation and initiating the late lock acquire for the current critical section.

17. The method of claim 16, wherein the late-lock acquire event is selected from a group comprising expiration of a watchdog timer, selecting a cache line for eviction that has tracked a memory access during execution of the critical section, and encountering an irrevocable event.

18. The method of claim 16, wherein initiating a late-lock acquire for the current critical section includes initiating a store of a lock value referencing a lock address, the lock value and address to be held in a lock stack entry associated with a reference to the lock acquire operation for the current critical section.

19. The method of claim 18, further comprising stalling a plurality of senior stores held in a store buffer in response to initiating the late lock acquire for the current critical section, wherein the plurality of senior stores are unblocked to be dispatched in response to the store of the lock value referencing the lock address retiring.

20. The method of claim 16, wherein initiating the late-lock acquire for the critical section is further in response to globally observing a plurality of pending fill buffer entries and determining a lock stack entry associated with the critical section is updated with a lock value.

21. The method of claim 20, further comprising:
blocking creation of a checkpoint associated with the subsequent critical section in response to stalling the subsequent lock acquire operation for the subsequent critical section.

22. The method of claim 21, further comprising:
determining the subsequent critical section is not a nested critical section, wherein blocking creation of the checkpoint is further in response to determining the subsequent critical section is not a nested critical section.

23. The method of claim 22, wherein determining the subsequent critical is not a nested critical section comprises:
draining a store buffer in response to the store buffer holding store buffer entries;
in response to the store buffer being drained:
determining the subsequent critical section is a nested critical section responsive to not detecting a current end critical section operation; and
determining the subsequent critical section is not a nested critical section responsive to detecting a current end critical section operation.

24. The method of claim 21, wherein the subsequent lock acquire operation for the subsequent critical section includes a Load with Store Intent (L_S_I) operation, and wherein blocking creation of the checkpoint associated with the subsequent critical section comprises:
blocking the L_S_I operation from being dispatched from a load buffer.

* * * * *